UNITED STATES PATENT OFFICE 2,534,247

8-HALOXANTHINE SALTS OF 1-DIARYL-METHYL-4-ALKYLPIPERAZINE

John W. Cusic, Skokie, Ill., assignor to G. D. Searle & Co., Chicago, Ill., a corporation of Illinois No Drawing. Application February 10, 1950, Serial No. 143,593

8 Claims. (Cl. 260—253)

This invention relates to salts of 1-diarylmethyl-4-alkylpiperazines with 8-haloxanthines which contain a hydrogen atom in position 7 and to the production thereof. More particularly this invention relates to salts of organic bases of the general structural formula

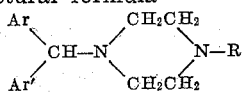

wherein Ar and Ar' are aromatic radicals and R is an alkyl radical, with 8-haloxanthines which contain a hydrogen atom in position 7.

In the foregoing structural formula Ar and Ar' represent the same or different monocarbocyclic aromatic radical and include phenyl, p-chlorophenyl, p-bromophenyl, o-chlorophenyl, p-methoxyphenyl, p-fluorophenyl, p-iodophenyl, m-chlorophenyl, p-tolyl, o-tolyl, 2,4-xylyl, p-ethoxyphenyl, 2,4-dimethoxyphenyl, 2,4-dichlorophenyl, and related radicals of the benzene series. R represents a lower alkyl radical containing 1 to 5 carbon atoms and includes methyl, ethyl, propyl, isopropyl, butyl, isobutyl, secondary butyl, amyl and isoamyl radicals.

It is recognized that organic bases of the foregoing structural formula, which are widely used as antihistaminic drugs, elicit certain undesirable side reactions and toxic manifestations, the most common of which are drowsiness and dizziness. It is the object of this invention to produce new therapeutic substances which are relatively free from such untoward reactions. Another object is to produce salts of antihistaminic agents and haloxanthines which have reduced toxicity. A further object is to produce such salts having enhanced therapeutic efficacy. Other objects will be apparent to those skilled in the art in view of the disclosure given herein.

I have discovered that salts of organic bases of the foregoing formula with haloxanthines produce little effect on the central nervous system and appear to be more useful therapeutically than any of the individual components alone. Such salts exert a potentiating effect and show enhanced activity in combating the effects of histamine. They are particularly useful in the treatment of anaphylaxis and allergic disorders. Certain of the salts within the scope of this invention are so free from undesirable side effects that they may be used in the treatment and prevention of motion sickness.

Among the halogenated xanthines to which this invention pertains are the chloro, bromo, and iodo derivatives of theophylline and related xanthines which have a hydrogen atom in position 7. In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic bases are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope.

Example 1

10 parts of 8-chlorotheophylline and 12 parts of 1-(p-chlorobenzohydryl)-4-methylpiperazine, which has the formula

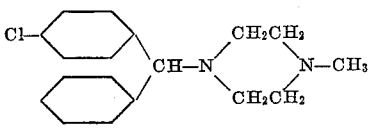

are thoroughly mixed and dissolved in a boiling mixture of 60 parts of methyl ethyl ketone and 12 parts of water. The hot solution is treated with activated charcoal, filtered and evaporated. The residue of the 8-chlorotheophylline salt of 1-(p-chlorobenzohydryl)-4-methylpiperazine is triturated with ether and dried. A sample on analysis showed 13.48% chlorine; the calculated value is 13.71%.

*Example 2*

12.5 parts of 8-bromotheophylline and 18 parts of 1-(p-chlorobenzohydryl)-4-methylpiperazine are mixed and dissolved in a boiling mixture of 80 parts of methyl ethyl ketone, 20 parts of ethanol and 15 parts of water. The hot solution is filtered and evaporated under reduced pressure. The residue of the 8-bromotheophylline salt 1-(p-chlorobenzohydryl) - 4 - methylpiperazine is triturated with dry ether and dried. A sample on assay showed 44.9% 8-bromotheophylline; the calculated value is 45.3%.

*Example 3*

A mixture of 6 parts of 1-(p-methoxybenzohydryl)-4-methylpiperazine, which has the formula

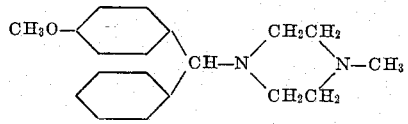

and 3.8 parts of 8-chlorotheophylline is agitated in a boiling mixture of 40 parts of methyl ethyl ketone and 8 parts of water until dissolved. The hot solution is filtered and evaporated under vacuum. The residue of the 8-chlorotheophylline salt of 1-(p-methoxybenzohydryl) - 4 - methylpiperazine is removed and dried. A sample on analysis showed 6.73% chlorine; the calculated value is 6.94%.

I claim:

1. A salt of an organic base of the formula

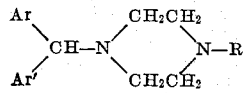

wherein Ar and Ar' are monocarbocyclic aromatic radicals and R is a lower alkyl radical, with an 8-haloxanthine which contains a hydrogen atom in position 7.

2. A salt of an organic base of the formula

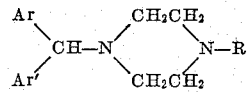

wherein Ar and Ar' are monocarbocyclic aromatic radicals and R is a lower alkyl radical, with an 8-halotheophylline which contains a hydrogen atom in position 7.

3. An 8-halotheophylline salt of an organic base of the formula

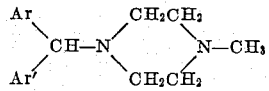

wherein Ar and Ar' are monocarbocyclic aromatic radicals.

4. An 8-chlorotheophylline salt of an organic base of the formula

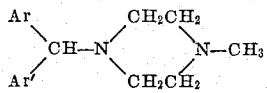

wherein Ar and Ar' are monocarbocyclic aromatic radicals.

5. An 8-bromotheophylline salt of an organic base of the formula

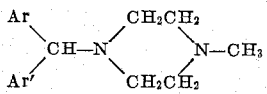

wherein Ar and Ar' are monocarbocyclic aromatic radicals.

6. The 8-chlorotheophylline salt of 1-(p-chlorobenzohydryl)-4-methylpiperazine.

7. The 8-bromotheophylline salt of 1-(p-chlorobenzohydryl)-4-methylpiperazine.

8. The 8-chlorotheophylline salt of 1-(p-methoxybenzohydryl)-4-methylpiperazine.

JOHN W. CUSIC.

No references cited.